United States Patent [19]

Fleshman

[11] 3,994,260
[45] Nov. 30, 1976

[54] UNIVERSAL POULTRY CAGE

[76] Inventor: Roger L. Fleshman, 2513 Garfield Ave., Loveland, Colo. 80537

[22] Filed: Jan. 15, 1975

[21] Appl. No.: 541,229

[52] U.S. Cl. .................................. 119/17; 119/21; 119/48
[51] Int. Cl.² .......................................... A01K 31/00
[58] Field of Search ............................. 119/17–19, 119/21, 22, 48, 1

[56] References Cited
UNITED STATES PATENTS

| | | | |
|---|---|---|---|
| 1,703,625 | 2/1929 | Jackson | 119/17 |
| 1,977,467 | 10/1934 | Bomberger et al. | 119/19 |
| 2,963,003 | 12/1960 | Oberg et al. | 119/1 |
| 3,375,808 | 4/1968 | Freeman | 119/19 |
| 3,545,406 | 12/1970 | Osborn | 119/48 X |
| 3,593,689 | 7/1971 | Van Huis | 119/18 |
| 3,757,741 | 9/1973 | Siciliano | 119/17 |
| 3,768,443 | 10/1973 | Keen et al. | 119/22 |
| 3,830,200 | 8/1974 | Patterson | 119/17 X |

*Primary Examiner*—J.N. Eskovitz
*Attorney, Agent, or Firm*—James E. Pittenger

[57] ABSTRACT

A poultry cage for accomodating most species of domesticated birds from the day of hatching to maturity having a generally rectangular, rigid, open frame structure with the sides, top and floor covered with an open mesh material. The mesh on the top surface has smaller openings than the rest to catch and retain the manure from any above cages and allow it to quickly air dry due to natural ventilation. The floor of the cage is hinged along the rear edge and includes a positional catch at each front corner to allow the floor to be held in various positions or opened and removed completely. A portion of the cage floor spaced from the front and hinged parallel to the front edge is provided to pivot upwardly so as to lean against the cage front to trap the young birds in the front portion of the cage keeping them near the source of feed and water. A portion of the cage top is hinged to permit placing or removing birds from the cage. A snap-on egg retaining trough is provided to permit productive use with egg laying poultry.

10 Claims, 13 Drawing Figures

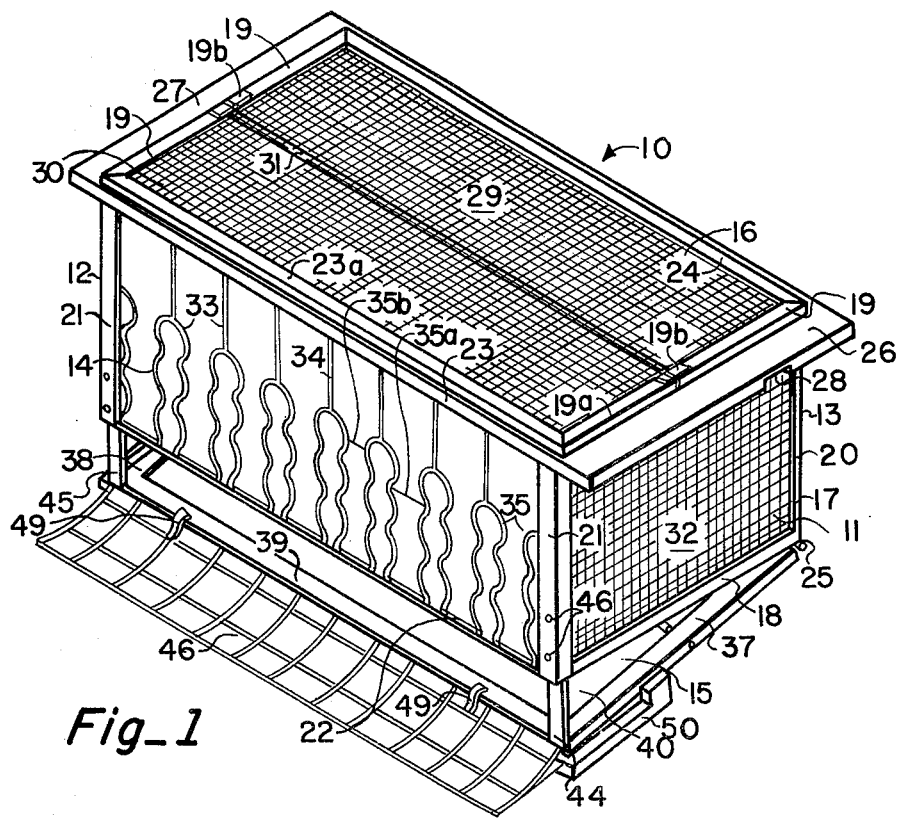
Fig_1
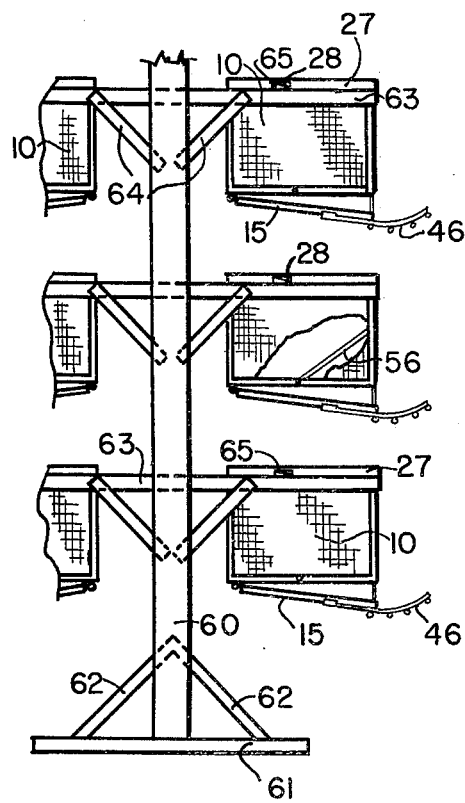
Fig_2
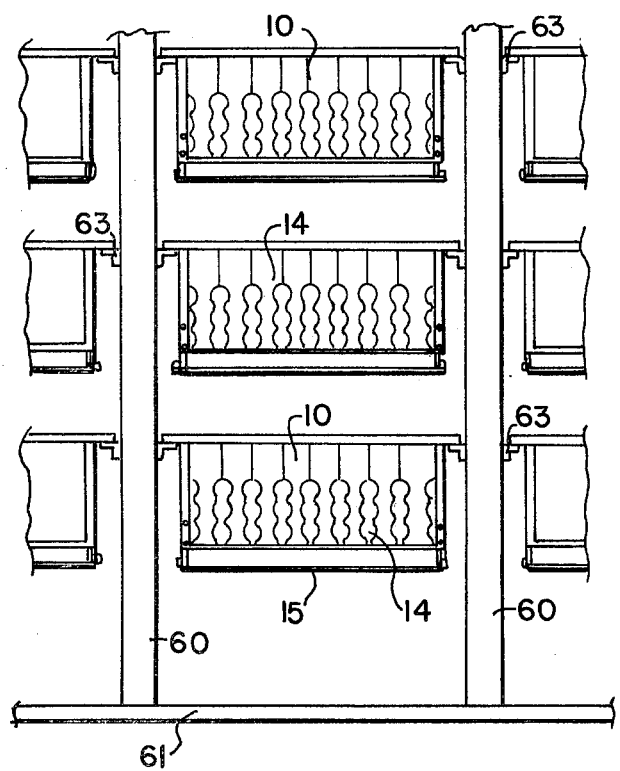
Fig_3

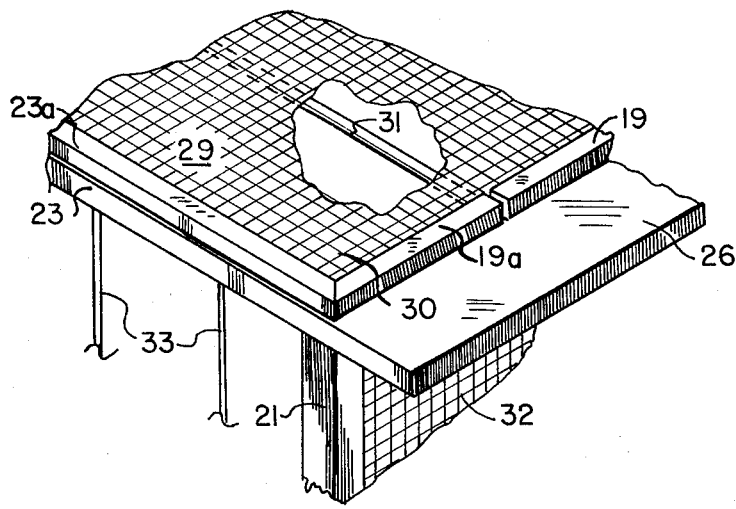
Fig_4
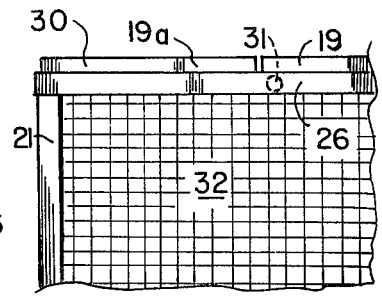
Fig_5
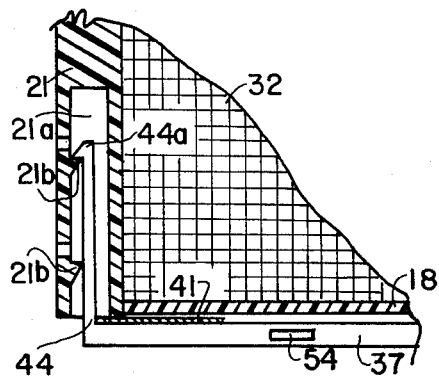
Fig_6
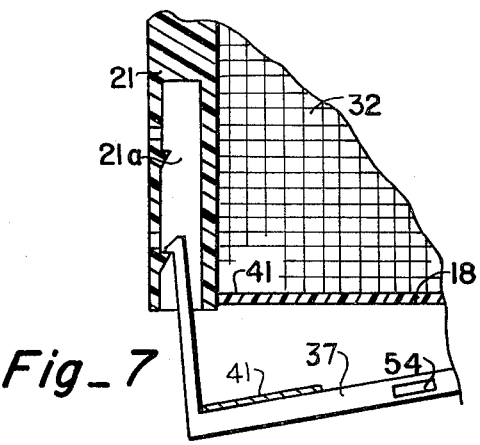
Fig_7
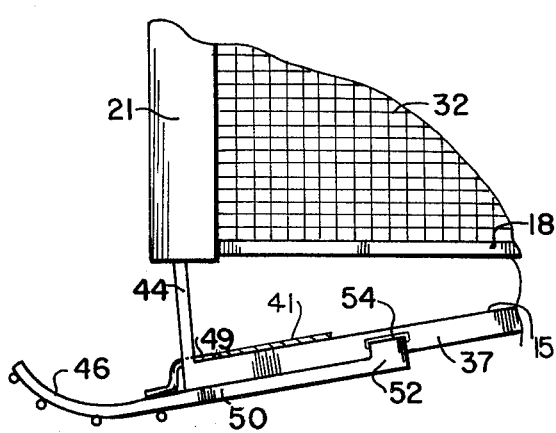
Fig_8
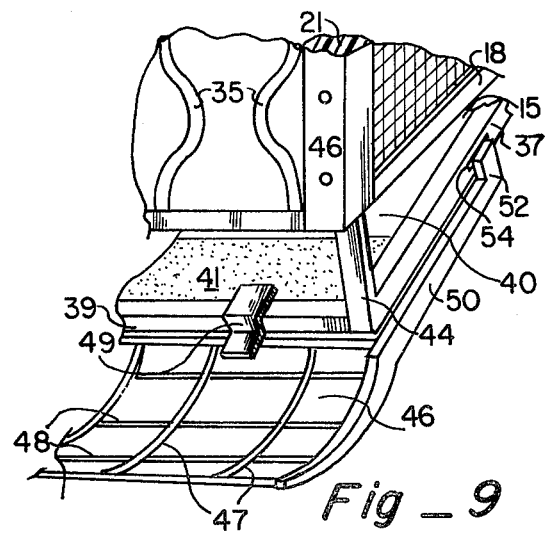
Fig_9

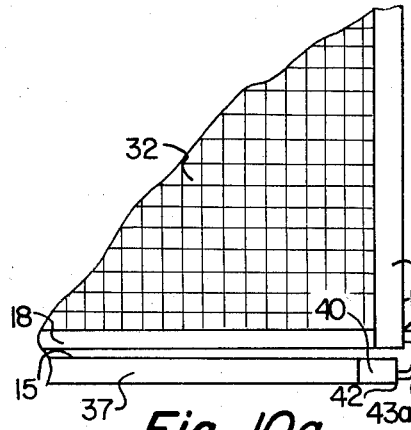
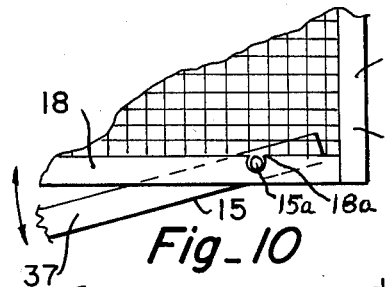
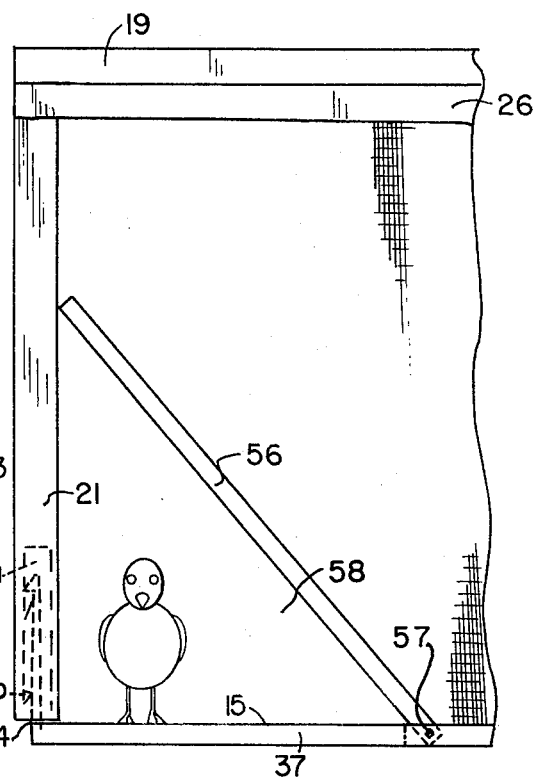
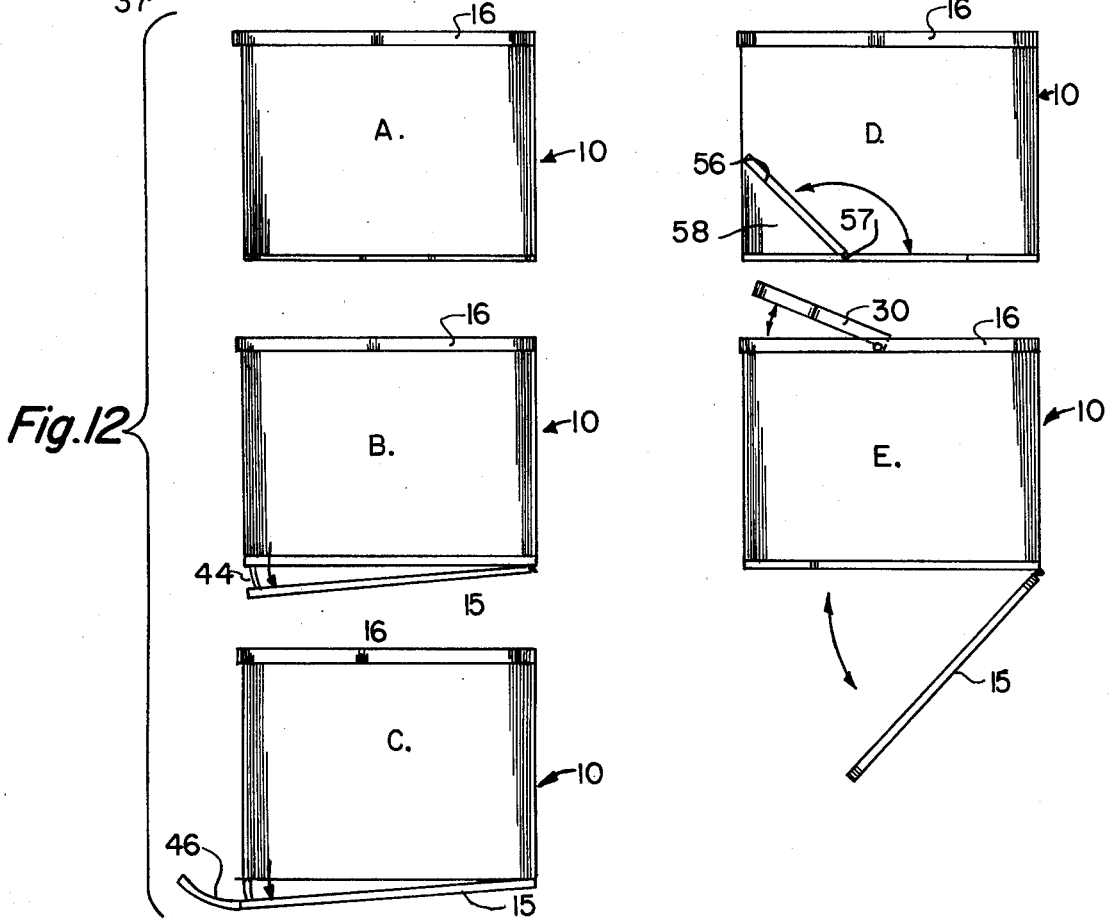

UNIVERSAL POULTRY CAGE

BACKGROUND OF THE INVENTION

This invention is directed to a universal poultry cage capable of raising poultry from hatching to maturity to promote production and reduce overall operating costs. It is more specifically directed to a poultry cage having a molded frame covered substantially with a non-metallic open mesh material and having a hinged floor and top to promote access and cage expansion during growth.

Poultry cages during the past have taken on many configurations and shapes which are far too numerous to define here. This area of the art is fairly well known and is fairly common. For example, poultry can be raised in open hen houses with brooders provided on the floor for the initial growth of layers and broilers. Roosts are provided as the poultry matures with nests provided for layers for the collection of eggs.

With the advent of poultry farms and in order to promote productions, buildings housing a multitude of cages were provided to increase the number of birds that could be accommodated within a given floor area. It has been found, however, that a number of various sized cages are necessary for the purpose of raising birds from hatched or young condition to maturity. This in some cases may require several cages or facilities to accomodate the birds during various stages of growth. It is a serious problem to properly rear birds in cages without having a high mortality rate, breast damage and breakage of wing bones and leg bones. In addition, if a cage for large or mature birds was used to house poultry, a high escape rate was found which necessitated the requirement of covering the face of the cage with additional restricting members. In some cases where feed troughs were provided along the front edge of the cage a problem existed in properly positioning the trough so that the young birds could feed with the trough position being changed to accomodate various stages of growth.

In addition to these problems, it became evident that the more frequent transferring and handling of poultry from one cage to another produced a traumatic condition in the birds which often resulted in injury, damage or death. Because of this, considerable production losses and downgrading of carcasses when processed existed which lowered the over-all net profit.

Another problem was found when the birds, especially broilers, are reared in cages. Up to this time, most cages have a wire floor usually made from metallic wires layed in parallel rows with cross tie members welded together forming a rigid but open surface to allow droppings or manure to pass through. Actual experience with this type of cage surface has shown that bruises and injuries occur to the breast meat and legs of the birds which require a substantial portion of the birds to be downgraded in quality with a loss of profit to the producer.

Manure and manure disposal is a continuing and expensive problem encountered in the poultry industry. When the industry began to use cages stacked one above the other it became necessary to provide some sort of shield to protect the birds in the lower cages in order to maintain clean conditions and reduce the possibility of disease. A solid sheet of material is commonly provided. The manure collects on the upper surface of these "dropping boards" and is periodically scraped off and collected.

Poultry manure appears to have possible use as feed for poultry and livestock as well as fertilizer. Moisture is a major problem both in the scraping and handling which is a messy procedure and in the drying for reuse processing. It is necessary to pass the manure through a drying process to turn the wet manure into a usable product. This additional step of drying renders the reuse economically marginal.

For the above reasons, it is an object of the present invention to provide a single universal cage which can accommodate poultry or fowl from the day of hatching to maturity.

A further object of the present invention is to provide a single universal cage which would eliminate the requirement for cages of different configurations to handle poultry of various sizes and species.

Another object of the present invention is to provide a poultry cage which is integral, light weight and self-contained and which can be handled as a single unit so as to be positioned and transported as desired without removing or disturbing the poultry.

A still further object of the present invention is to provide a poultry cage which can be used for either broiler or layer type poultry and which can be mass produced with simple and economical manufacturing techniques.

A further object of the present invention is to provide a universal poultry cage which can be suspended on suitable supports in a tiered arrangement whereby a number of birds can be accomodated within a given area and which provide a simple and efficient arrangement for feed and water to the poultry along with servicing and cleaning of the cages.

Another object of the present invention is to provide a poultry cage wherein the young poultry can be restricted in a small area of the cage to limit their movement so as to promote starting ability to reduce mortality.

An additional object of the present invention is to provide a poultry cage having resilient support and restraining surfaces whereby the birds will sustain a less chance of injury or bruising to maintain a high product.

A still further object of the present invention is to provide a porous resilient upper or top surface in a stacked poultry cage which is capable of catching and collecting the manure droppings from the higher cages which will allow air to circulate through the residue allowing it to dry rapidly so that it can be easily removed, handled and processed.

A further object of the present invention is to provide a poultry cage wherein the floor is pivotally hinged to allow it to be opened or positionally sloped to provide rapid access to the interior of the cage as well, to increase the overall interior height of the cage to accomodate the growth of the poultry contained therein and to allow rapid removal of the birds will less harm or injury.

SUMMARY OF THE INVENTION

The poultry cage of the present invention is designated a universal cage because it is designed to accomodate various size, age and type of birds without limitation or restriction. Thus a single cage can be provided from the day the bird is hatched until its maturity or even after in the case of a layer, without regard to the species of the bird such as a chicken, turkey, duck, game hen, or the like.

The cage of the present invention is formed from an open rectangular structure of frame which can be molded from a suitable plastic or synthetic resin, possibly reinforced with fiber, which can be either formed by injection or vacuum molding depending upon the final shape of the structural members. The front or feed access bars of the cage can be provided in accordance with the description provided in my U.S. Patent application Ser. No. 527,708, filed Nov. 27, 1974 entitled "Poultry Cage Front". As described therein, the bars have an upper straight or stem portion with the stem splitting into bifurcated legs having an aligned sinuous or wavy configuration extending downwardly to the cage floor. The wide and constricted areas formed between the legs and bars prevent small poultry from escaping through the bars yet permits the poultry to feed through the cage front during their growth without the possibility of escape.

The remaining sides of the cage are covered with a porous or open mesh net type material made from suitable fibers. These fibers can be either natural, such as hemp, cotton, or the like or synthetic such as nylon, dacron, or the like. Nylon or polyester appear to be very satisfactory since they provide resilience along with high strength. If desired, the mesh material except the material used for the manure drying function can be coated with a thin layer of plastic or other similar material to increase strength and improve the wear characteristics. The shape of the openings in the mesh can be square, rectangular, polygonal, or circular or irregular, depending upon the type of mesh used.

The dimensions of the mesh openings in the floor can be of any size which provides suitable support and footing for the poultry such as ½ to 1 ¼ inch. The opening dimensions in the side mesh can be larger so long as the smaller birds can be retained.

The mesh openings in the top are necessarily quite small with the mesh designed to catch and hold the manure droppings from the cages positioned above. It has been found that openings of 1/16 to ⅜ inch on a side or diameter are generally satisfactory. and still allow air circulation to expedite drying of the manure. A vacuum cleaning device having an elongated slotted opening with fixed or rotating brushes along each side can be used to pass over the cage top to break up and remove the dried manure without the usual mess and odor.

All four sides of the cage can be rigidly joined without any doors or major openings therein. The front portion of the top of the cage may be hinged to permit access for ingress and egress of poultry for replacement purposes. At the same time the entire floor of the cage is hingedly mounted along the back or rear edge to permit the front edge of the cage to be lowered to allow the floor to slope toward the front. In this way the cage interior height can be increased to accommodate larger birds and at the same time, in the case of layers, to permit any eggs being laid to roll forward and out of the cage. An egg collection trough having the same width as the cage itself is designed to snap onto the front edge of the floor to retain any eggs that may be layed. A notched catch is provided at the front corners of the floor to retain the floor in various positions and also to permit the floor to be released to quickly dump or remove the poultry contained therein without the necessity of individually handling the birds. The height of the cage may be returned to its original low profile by raising the floor or more simply by setting the cage down on a solid surface or on the top of another cage. A low profile is desirable for purposes of transportation.

The size of the cage can be arranged as needed with the height, width and depth designed to accomodate all the anticipated sizes or species of birds. In mose cases, a cage having a width of approximately 4 feet with a shallow depth of possibly 21 to 24 inches is believed to be satisfactory. This size is capable of being handled with reasonable ease.

A rack structure can be provided whereby the cages can be stacked in rows suspended on arms extending outwardly from support columns. Each cage can have support flanges extending outwardly from the sides with the rack arms spaced to correspond with those flanges so that the cage can be slid into place. A notch to catch in the cage flange is provided to properly align the cage and to hold the cage in alignment. The rack can be designed as desired to hold any number of cages in a tiered arrangement and on each side of support columns with the rows of cages back to back or face to face if feeding and watering is anticipated to be positioned along the central inner portion of the rack.

Another feature of the poultry cage according to the present invention is the provision whereby a section of the floor can be pivoted upward and towards the front so that the upper edge of the cage floor can be fastened or leaned against the front surface of the cage. In this way small birds can be restricted in their movements to the front portion of the cage floor to concentrate them in the area where food and water are available so they may easily find the food and water for better startability of young birds. This is especially important for starting turkey poults and game chicks.

The cage of the present invention lends itself to intermittent feeding and watering which is provided by the periodic passage of a feed and water carriage along the cage aisle at sutiable intervals. This arrangement is described in my copending patent application Ser. No. 448,840. It is to be understood, however, that the herein described cage can also be used with conventionl feed and water troughs attached to or positioned adjacent to the cage.

BRIEF DESCRIPTION OF DRAWINGS

Other objects of this invention will appear in the following description and appended claims, reference being made to the accompanying drawings forming a part of the specification where like reference characters designate corresponding parts in the several views.

FIG. 1 is a perspective view of the universal cage according to the present invention;

FIG. 2 is a side elevation view showing the cages mounted in stacked arrangement in a support structure;

FIG. 3 is a front view of the suspended cages shown in FIG. 2;

FIG. 4 is a close-up perspective view of the upper front of the cage showing the hinged portion of the top;

FIG. 5 is a partial side view showing the hinged portion of the top;

FIG. 6 is a partial sectional view of the catch device for positioning the floor of the cage;

FIG. 7 is a partial sectional view showing the catch device positioned to slope the cage floor;

FIG. 8 is a side view showing the snap-on egg retaining trough attached to the front edge of the cage floor;

FIG. 9 is a perspective view of the egg trough shown in FIG. 8;

FIG. 10 is a partial side view showing an internal releasable hinge joining the recessed floor to the cage body;

FIG. 10a is a partial side view showing a releasable hinge joining the floor to the rear edge of the cage;

FIG. 11 is a partial side view of the cage with the portion cut away to show the hinged floor sections in the raised position to retain chicks in the front area of the cage to encourage feeding; and FIGS. 12 A–E are pictorial side views of the cage according to the present invention showing the various features and steps during use.

DETAILED DESCRIPTION OF THE EMBODIMENTS

Turning now more specifically to the draings, FIG. 1 shows the universal poultry cage 10 according to the present invention having sides 11, 12, rear 13, front 14, floor 15 and top 16. An open, generally rectangular frame 17 forms the structure or skeleton of the cage 10. The frame 17 includes side members 18 and 19 which are identical on each side with rear corner posts 20 and front corner posts 21 providing vertical rigidity. Longitudinal or cross members 22, 23, 24 and 25 complete the basic body frame 17. Mounting flanges 26, 27 are attached to and extend laterally outward from the upper side members 19. These flanges 26, 27 each include a cut-out notch 28 which is used to hold the cage in its mounted position.

The cage top 16 is defined by side members 18, 19 and cross members 23, 24. Open mesh or net material 29 is stretched tightly between the members and fastened by securing devices (not shown) to form the top 16 or dropping board for the cage. Since this surface is intended to catch and retain manure from above cages, the pores or openings of the mesh are quite small, i.e., ⅛ of an inch on a side or diameter. In this way, as explained hereinabove, the manure is allowed to dry quickly due to natural air ventilation through the mesh.

To provide an access door 30 to the cage 10, the top side member 19 are joined by a hinge device 19b to section 19a. The door sections 19a are connected along the front edge by cross member 23a. The mesh material 29 is stretched between the members to form a flat surface when the door 30 is in the closed position shown in FIGS. 1 and 4. As shown in FIG. 4, the hinge device 19b can be omitted with the mesh material forming a living hinge. A mesh support bar 31 can be provided to prevent the top material from sagging.

The sides 11, 12 and rear 13 of the cage frame 17 are covered by similar mesh material 32 as the top material 29. The openings of the mesh 32 since this mesh is intended only to retain the poultry can be substantially larger than the top mesh 29. Openings within the range of ½ to ¼ inch have been found to be satisfactory.

The front 14 of the cage 10 is designed to allow the poultry to feed and water through openings provided therein. Vertically positioned bars 33 having stems 34 and downwardly extending sinuous legs 35 are equally spaced across the front of the cage. The curved portion of the legs 35 form wide 35a and constricted 35b areas which permit the birds to extend their heads for feeding and watering purposes without escape.

The removable cage floor 15 has an outside rectangular frame 36 sized to correspond to the frame 17 of cage 10. The floor frame 36 has sides 37, 38 and cross members 39, 40 joined together at their ends. A mesh material 40 which can be the same as the side mesh 32 is stretched tight and secured over the floor frame 36. The mesh floor serves a very important function in that it is easily capable of supporting the poultry but is resilient and prevents breast injury to the birds especially broiler type chickens which is experienced with rigid wire cage floors. As shown in FIG. 9, a thin plastic sheet or tape 41 having an upper abrasive surface can be provided along the front edge of the floor where the birds normally stand while feeding. The tape 41 reduces wear on the mesh floor 40 and at the same time wears down the claws of the birds to reduce the chance of injury to other birds during encounters.

As shown in FIG. 10, the floor 15 can be recessed within the bottom of the cage frame 17. A hinge pin 15a extends outwardly on both sides of the floor 15 and fits into necked openings 18a, 19a formed in side members 18, 19, respectively. As can be seen the floor 15 can easily pivot downwardly or upwardly into the cage if desired. The floor can also be removed from the cage by merely lifting upward on each side of the floor to lift the pins 15a from the openings 18a, 19a. The recessed floor arrangement permits the weight of the cages especially when stacked to rest on the corner members of the frame rather than through the floor and frame of each cage.

In another embodiment, the rear edge 42 of the floor 15 is joined to the cage frame 17 by means of a plurality of releasable hinges 43. A horizontal pin 43a is fastened to the rear cross member 25 of the frame 17 and a curved support tongue 43b fastened to the floor 15 rests over the pin 43a to support the rear of the floor. By releasing the front of the cage floor, the floor can pivot downwardly or the entire cage can be raised by pivoting upward until the cage rear 13 is laying on the ground completely exposing the floor and any birds present. The tongue 43b can be slidably removed from the pins 43a and the cage and floor completely separated. In this way, different floor and cage combinations can be substituted if desired. This arrangement also facilitates the removal of the birds from the cage without individual handling.

At the front corners of the floor 15 upwardly extending catch members 44, 45 are provided which fit into the hollow ends 21a of the corner posts 21. A plurality of vertically spaced ledges 21b are provided along the inside surface of the ends 21a. A hook or catch 44a, 45a are provided at the ends of the arms 44, 45, respectively, which engage the ledges 21b. The members 44, 45 have sufficient length to allow them to bend releasing the hook 44a, 45a from the ledge 21b to adjust the position of the floor 15. Holes 46 are provided in the front face of the corner posts 21 immediately above each ledge 21b so that an object, such as a pencil, shaft or pin, can be inserted to release the catch members 44, 45, when desired. When the uppermost ledge 21b is engaged the floor is in the raised, closed position. When the lower ledges 21b are engaged the floor can be positioned at various slopes depending upon the number and position of the remaining ledges. By releasing the members 44, 45 from the cavities 21a the cage or floor can be removed as explained above. Special tools (not shown) having properly positioned release pins may be used to drop the floor to various positions gently or to release the floor through all positions at one time.

As the poultry within the cage grow and increase in size and height, the overall height within the cage can be increased merely by changing the slope angle of the floor. Thus various sizes and ages of birds can be accomodated within the present cage merely by adjusting the floor position.

The sloping of the cage floor also allows use with egg laying poultry. The sloped floor permits the eggs to roll down and out of the cage preventing cannibalism and destruction by the poultry. A snap-on type egg retaining trough 46 is installed when necessary to the front edge of the floor 15. The trough 46 is formed by a plurality of curved ribs 47 and stringers 48 which provide a concave or dish shape to the trough 46 to catch and retain the eggs. Curved clips 49 fit over the front cross member 39 of the floor 15 to support the trough. Arms 50, 51 having inwardly extending ears 52, 53, respectively, at their ends, engage slots 54, 55 provided in the side members 37, 38 of the floor. With this simple arrangement the trough 46 can be quickly and easily installed and removed as needed. In addition, the entire cage can be rested on the ground with the trough installed without interferring with the closing or movement of the floor.

The floor 15 of the cage is arranged so that a section 56 extending the width of the cage can be hinged by pins 57 or other suitable means so that the section 56 can be pivoted upwardly to lean against the front 14 of the cage. The depth of the section 56 must be greater than the distance between the cage front and the location of the hinge pins 57 to form a cavity 58 between the leaning floor section 56, floor 15 and front 14. Small chicks can be restricted to the floor area within this cavity adjacent to the front of the cage so that they will drink and feed with it is available. It has been found that small chicks when free in a large cage tend to get lost and are unable to find food and water especially when on a timed feeding cycle. Thus, the pivotal floor keeps then where the food is located.

It is understood the pivoting floor section 56 can be a separate section laying on top of the existing floor or it can be a portion of the cage floor which is pivoted and leaves an opening in the floor when in use.

The cages 10 according to the present invention can be mounted and supported in various arrangemtns. FIGS. 2 and 3 show one possible arrangement. Posts or columns 60 are vertically mounted in the ground or on concrete 61 and stabilized by braces 62, if required. A plurality of pairs of outwardly extending horizontal mounting arms 63 and knee braces 64 are provided. The mounting arms 63 are parallel to each other and vertically and horizontally spaced to adequately accomodate the poultry cages 10. The individual cages are slidably positioned so that the mounting flanges 26, 27 rest on the upper surface of the arms 63 and the tabs 65 fit into the notches 28 provided in the cage flanges 26, 27. In this way the cages can not be accidentally misaligned. Any number of cages can be suspended one above the other and in rows to substantially fill a given building.

In another mounting arrangement a T-shaped mounting arm (not shown) can be mounted to extend horizontally outward from the center of the columns so that the flanges from adjacent cages can share the same arm. In this way the upper surface of the cages is essentially contiguous to form a relatively unbroken manure collecting surface that can be easily cleaned by a vacuum apparatus.

FIG. 12 shows the various operating functions and positions in which a cage of the present invention can be used. The arrangement shown in view A is for day old or young chicks with the arrangement shown in view D provided to show the floor section 56 raised to restrict the movements of the chicks to the front of the cage for feeding purposes. As the birds increase in size and age so that they no longer need to be restricted, they will knock back the section 56 allowing access to the entire cage. In the alternative, a jet of compressed air can be directed through the cage front to impinge on the section 56 to knock it back to its original position.

View B shows the front edge of the cage lowered to produce a slope and increase the overall internal height of the cage to accomodate mature poultry. View C shows the inclusion of the snap-on egg retaining trough to catch eggs when the cage is used with layers.

View E shows the access openings for the cage with the top opening 30 primarily provided to introduce small birds to the cage. The opening and possible removal of the floor 15 is provided to easily and quickly remove the mature birds from the cage for processing.

It is to be understood that the mesh material described hereinabove and used as the cage top surface to catch and dry the poultry manure can also be used in other ways wherever the manure is present to greatly accelerate the drying process. Thus, a short or continuous length of mesh material can be suspended above and separated from the cages to act as a dropping board. This material can be stretched across a frame or tied in place at necessary intervals to the cage support structure. In another use, the mesh and a small frame can be provided as a portion of a cage top structure possibly set at a sloped angle to shield the top as well as one or more sides of the cage.

In another arrangement, the mesh can be used as a belt for a manure collection or transporting conveyor running below a cage tier to catch and dry the manure. The manure, in many cases where the conveyor is slow moving, is sufficiently dry through the use of the mesh to allow it to be easily removed at the end of the conveyor. As can be readily seen any use of an open mesh, porous material which allows natural ventilation and accelerated drying of poultry manure is to be considered part of this invention.

While a universal poultry cage has been shown and described in detail, it is to be understood that this invention is not to be limited to the exact form disclosed in that changes in detail and construction may be made therein within the scope of the invention without departing from the spirit thereof.

Having thus set forth and disclosed the nature of this invention, what is claimed is:

1. A poultry cage to accomodate various types and species of birds from day of hatching to maturity, the cage comprising:

a. a cage body means having side surfaces and a top surface, said body means having an open, rigid frame and open mesh, non-metallic material stretched across and fastened to said frame to form said body surfaces;

b. a removable floor means arranged to close said body to retain poultry therein;

c. said removable floor means having an outer rigid frame and open mesh, non-metallic material stretched across and fastened to said frame, said mesh material having openings sized to allow manure to drop through and yet support said poultry without injury, said floor means having a releasable hinge means along one edge connecting the floor means to said cage means and having means along on opposite edge for positionally adjusting said floor means whereby said floor means can be arranged in a first position adjacent to said cage, a second position in which said floor means is sloped downwardly from said cage, and a third position with the adjusting means released so that the floor means pivots away from said cage means to release poultry retained therein;
d. said body means includes mounting means for suspending said cage; and
e. the mesh material covering the top of said body means has a plurality of openings having side dimensions or diameters within the range of 1/16 to ⅜ inch whereby any manure droppings from cages mounted above will catch and collect on said mesh material so that the manure will be rapidly dried by air circulating through said openings.

2. A poultry cage as defined in claim 1 wherein the releasable hinge means for said floor means includes a pin section fastened to said body means and a curved tongue section fastened to said floor means whereby when said floor adjusting means is released the floor means can be removed from said cage means.

3. A poultry cage as defined in claim 1 wherein the mesh material covering said body and floor means is made from synthetic fibrous material; and the rigid frames of said body and floor means are molded from a plastic material.

4. A poultry cage as defined in claim 3 wherein the mesh material covering said body and floor means is made from polyester.

5. A poultry cage as defined in claim 1 wherein the top surface of said body means has a hingedly mounted section to provide access to the interior of said cage for installing or removing poultry.

6. A poultry cage as defined in claim 1 wherein said floor means has a hinged section extending the width of said floor means and arranged to be pivotally raised to lean against a side through which the poultry feed to restrict the movement of the poultry to an area adjacent said side.

7. A poultry cage capable of being mounted with other similar cages in stacked one above the other relation, said cage having a top surface and porous material positioned and fastened so as to cover said top surface, said porous material having a plurality of individual openings having side dimensions or diameters within the range of 1/16 to ⅜ inch so that said material can catch and hold manure dropped from above cages and allow the manure to rapidly dry due to air circulation through the openings in said material.

8. A poultry cage as defined in claim 7 wherein the porous material covering the top of said cage is an open mesh, non-metallic material capable of absorbing and spreading the moisture from said manure to increase the drying rate so that it can be easily removed and more economically processed.

9. A poultry cage as defined in claim 8 wherein said open mesh material is woven from synthetic fibers.

10. A poultry cage to accomodate various types and species of birds from day of hatching to maturity, the cage comprising:
a. a cage body means having side surfaces and a top surface, said body means having an open, rigid frame and open mesh, non-metallic material stretched across and fastened to said frame to form said body surfaces;
b. a removable floor means arranged to close said body to retain poultry therein;
c. said removable floor means having an outer rigid frame and open mesh, non-metallic material stretched across and fastened to said frame, said mesh material having openings sized to allow manure to drop through and yet support said poultry without injury, said floor means having a releasable hinge means along one edge pivotally connecting the floor means to said cage means and having means along an opposite edge for positionally adjusting said floor means whereby said floor means can be arranged in the first position adjacent to said cage, a second position in which said floor means is sloped downwardly from said cage, and a third position with the adjusting means released so that the floor means pivots away from said cage means to release poultry retained therein;
d. said body means includes mounting means for suspending said cage; and
e. said cage means has a front side surface through which the poultry are able to extend their heads for feeding and watering, said front surface having a plurality of vertically mounted bars arranged parallel and equally spaced, said bars having an upper stem section and a pair of downwardly extending sinuous shaped legs wherein the legs form a series of wide and constricted openings through which the poultry can extend their heads without escaping from said cage.

* * * * *

PO-1050
(5/69)

UNITED STATES PATENT OFFICE
CERTIFICATE OF CORRECTION

Patent No. 3,994,260            Dated November 30, 1976

Inventor(s) Roger L. Fleshman

It is certified that error appears in the above-identified patent and that said Letters Patent are hereby corrected as shown below:

Column 1, line 22, change "productions" to --production--.

Column 1, line 34, after "house" add --young--.

Column 3, line 4, change "of" to --or--.

Column 3, line 32, after "polygonal," delete "or".

Column 3, line 42, after "openings" add --having dimensions--.

Column 3, line 42, after "satisfactory" delete the period (.)

Column 4, line 37, after "game" add --bird--.

Column 5, line 60, change "1/4" to --1 1/4--.

Column 7, line 37, change "with" to --when--.

Column 8, line 51, after "be" add --considered--.

Signed and Sealed this

Nineteenth Day of April 1977

[SEAL]

Attest:

RUTH C. MASON
Attesting Officer

C. MARSHALL DANN
Commissioner of Patents and Trademarks